United States Patent
Kim et al.

(10) Patent No.: US 7,041,400 B2
(45) Date of Patent: May 9, 2006

(54) UPGRADABLE SMART BATTERY PACK

(75) Inventors: Hun-June Kim, Daejeon (KR); Dae-Young Youn, Daejeon (KR); Dae-Jeong Kim, Seoul (KR); Sang-Min Kim, Seoul (KR)

(73) Assignee: Smart Power Solutions, Inc., (KR)

( * ) Notice: Subject to any disclaimer, the term of this patent is extended or adjusted under 35 U.S.C. 154(b) by 624 days.

(21) Appl. No.: 10/264,123

(22) Filed: Oct. 3, 2002

(65) Prior Publication Data
US 2003/0175560 A1   Sep. 18, 2003

(30) Foreign Application Priority Data
Mar. 18, 2002   (KR) .............................. 2002-14565

(51) Int. Cl.
*H01M 10/42* (2006.01)
*H01M 10/48* (2006.01)

(52) U.S. Cl. .................. 429/7; 429/61; 429/92

(58) Field of Classification Search .................... None
See application file for complete search history.

(56) References Cited

U.S. PATENT DOCUMENTS 5,710,501 A * 1/1998 van Phuoc et al. ......... 307/150

* cited by examiner

*Primary Examiner*—Jonathan Crepeau
(74) *Attorney, Agent, or Firm*—Cantor Colburn LLP

(57) ABSTRACT

An upgradable SMART (Self-Monitoring Analysis and Reporting Technology) battery pack capable of upgrading a SMART function thereof is provided, including a battery array, a host interface for supplying power to a host and performing a SMART communication therewith, a protection circuit for protecting battery cells in the battery array from overcurrent or overvoltage, a microprocessor for monitoring a current state of the battery array, calculating a battery capacity thereof and controlling the SMART communication with the host via the host interface, a nonvolatile memory for storing an operational program of the microprocessor and battery information, a signal processor for converting a level of a signal to be sent to the host via the host interface into a predetermined level that is desired by the host and processing the level-converted signal, and an input/output port for performing an interfacing operation between the host and the microprocessor to download a control program and data from the host.

7 Claims, 2 Drawing Sheets

UPGRADABLE SMART BATTERY PACK

BACKGROUND OF THE INVENTION

1. Field of the Invention

The present invention relates to a battery pack, and more particularly to an upgradable SMART battery pack which is capable of upgrading a SMART function thereof.

2. Description of the Related Art

It is common that battery packs used in high-performance mobile electronic equipment, such as notebooks, personal portable terminals, camcorders, etc., have a SMART (Self-Monitoring Analysis and Reporting Technology) function of performing a self-diagnosis operation by themselves and, if a problem is forecasted, reporting such a situation to an electronic device (referred to hereinafter as a "host"). Such battery packs with the SMART function are typically called SMART battery packs.

One such conventional battery pack with the SMART function comprises, as shown in FIG. 1, a battery array 100, a power terminal 300 appropriate to a host, and an electronic circuitry 200 for performing a battery protection function and SMART function. The electronic circuitry 200 includes a circuit for performing the battery protection function and a circuit for performing the SMART function, which circuits are composed of electronic components contained in a printed circuit board (PCB), typically called a battery control unit (BCU). That is, the electronic circuitry 200 includes a protection circuit 220 for protecting batteries, a microprocessor 210 for detecting current, voltage, temperature signals, etc. necessary to the operations of the batteries and operating the batteries on the basis of the detected signals, a nonvolatile memory 230 for storing a program necessary to the operation of the microprocessor 210 and unique information associated with the batteries, and a signal processor 240 for processing a signal for protection of the battery pack. The SMART battery pack with the above-mentioned construction is connected to the host via the power terminal 300 to supply power to the host and perform a SMART communication therewith.

The SMART battery pack as described above is manufactured by constructing a BCU circuitry, installing desired battery unique information and the program necessary to the operation of the microprocessor in the constructed BCU circuitry, performing a desired calibration operation with respect to the resulting BCU circuitry, attaching battery cells to the resulting BCU circuitry, and performing a packaging procedure of enclosing the resulting BCU circuitry with a plastic case and carrying out a finishing process with respect to the resulting structure using adhesives or in an ultrasonic welding manner.

Various functions of the conventional SMART battery pack must be upgraded when equipment of the host being in use is upgraded or for application of the same batteries to a different type of host. However, it is impossible to upgrade the various functions of the conventional SMART battery pack without disassembling the battery pack.

SUMMARY OF THE INVENTION

Therefore, the present invention provides an upgradable SMART battery pack which is capable of upgrading battery associated information and software stored therein without its disassembly.

According to one aspect of the present invention, an upgradable SMART battery pack comprises a battery array; a host interface for supplying power to a host and performing a SMART communication with the host; a protection circuit for protecting a battery cells in the battery array from overcurrent or overvoltage; a microprocessor for monitoring a current state of the battery array, calculating a battery capacity of the battery array and controlling the SMART communication between the host and the host interface; a memory for storing an operational program of the microprocessor and battery information; a signal processor for converting a level of a signal to be sent to the host via the host interface into a predetermined level that is desired by the host and processing the level-converted signal; and an input/output port for performing an interfacing operation between the host and the microprocessor to download a control program and data from the host.

In a feature of the present invention, in order to upgrade various functions of the upgradable SMART battery pack, a user can download and utilize a control program and data associated with the battery pack from a host, for example, a portable computer, camcorder, personal digital assistant (PDA) or the like without disassembling the battery pack. Furthermore, for application of the battery pack to a different type of host, the user can download and utilize a control program and data appropriate to the specifications of the different type of host without disassembling the battery pack.

Preferably, the input/output port may include a serial output terminal for uploading a control program and data stored in the nonvolatile memory to the host.

In particular, the upgradable SMART battery pack provides information regarding its control program or specifications to the host, and downloads and uses the optimum control program or data based on the provided information from the host. The battery pack can thus improve its performance.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Figure 1:
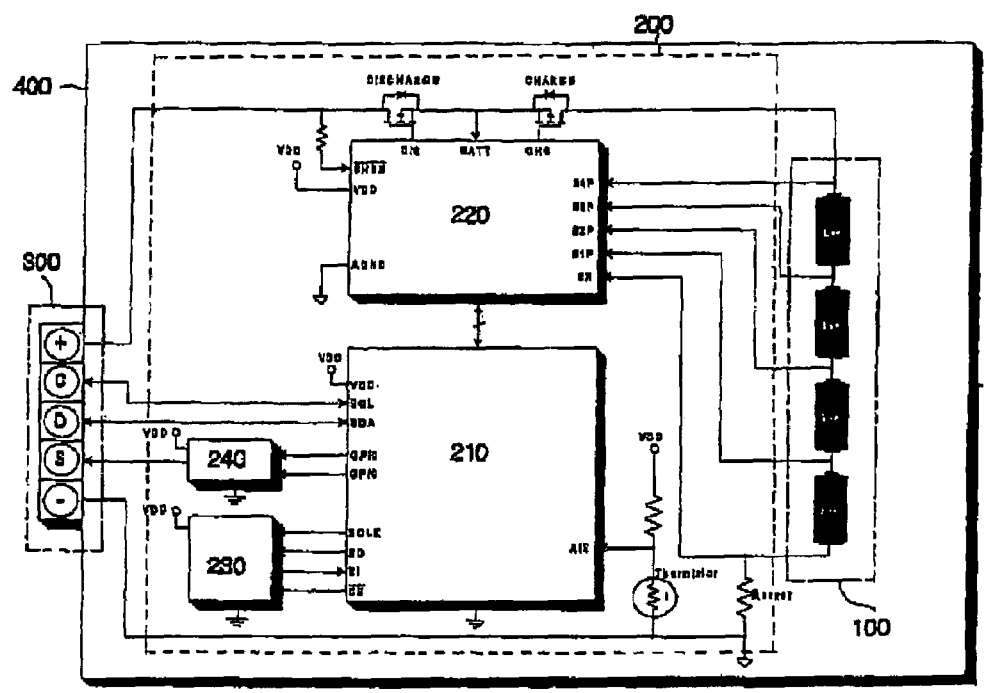
FIG. 1 is a block diagram schematically showing the construction of a conventional SMART battery pack.
Figure 2:
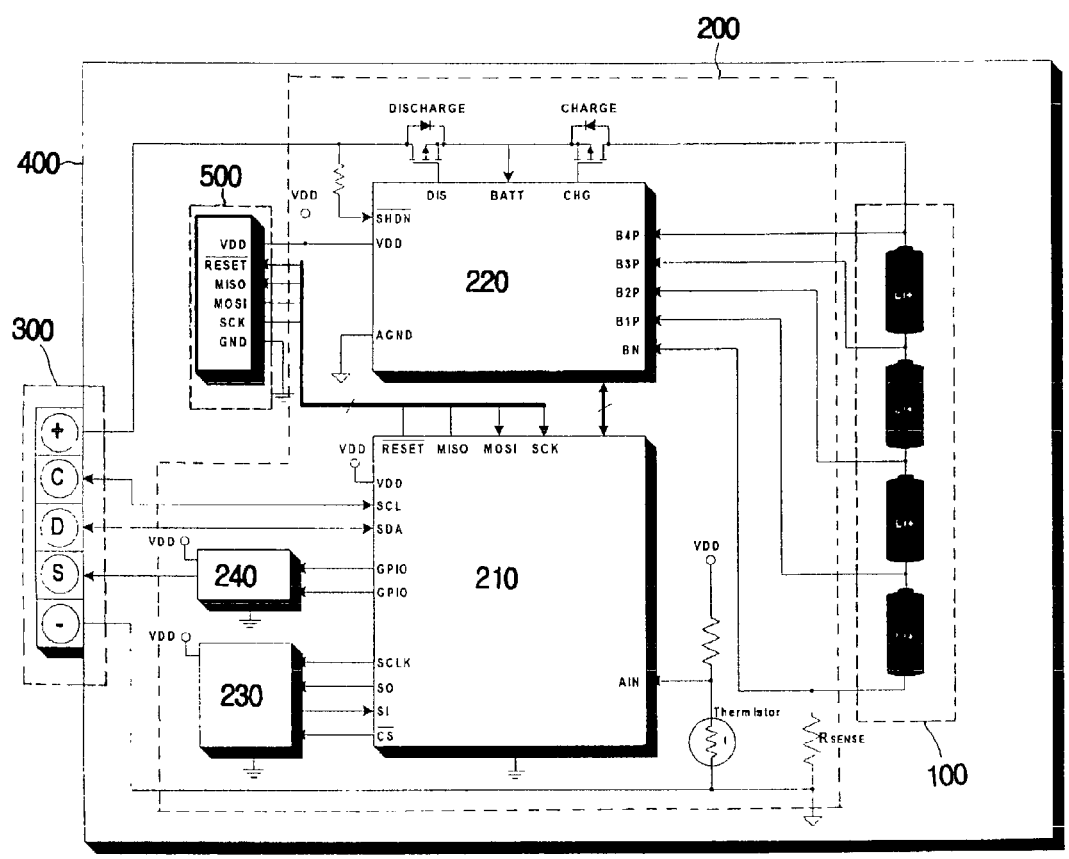
FIG. 2 is a block diagram schematically showing the construction of an upgradable SMART battery pack in accordance with a preferred embodiment of the present invention.

With reference to FIG. 2, there is schematically shown the construction of an upgradable SMART battery pack in accordance with a preferred embodiment of the present invention. As shown in this drawing, the upgradable SMART battery pack comprises a battery array 100, an electronic circuitry 200 including a protection circuit 220, microprocessor 210, nonvolatile memory 230 and signal processor 240, and a host interface 300.

The battery array 100 includes two or more battery groups, each being composed of one or more batteries. Namely, in the battery array 100, one or more battery cells, preferably a plurality of battery cells, are connected in a known serial/parallel connection manner to constitute two or more battery groups, thereby effectively controlling an inter-cell imbalance when the battery cells are in use.

The host interface 300 is a terminal device for supplying power to a host and performing a SMART communication therewith. The host interface 300 includes a plus terminal (+) and minus terminal (−) for charging and discharging current to/from the battery array 100, respectively. The host interface 300 further includes a data terminal D and clock terminal C for performing the SMART communication with the host in an SM-BUS communication manner, which is a one-wire synchronous communication manner. Alternatively, the host interface 300 may include one to three terminals for performing the SMART communication with the host in a one-wire asynchronous communication manner, a two-wire synchronous communication manner or a two-wire asynchronous communication manner. The host interface 300 further includes a terminal S for securing safety of the battery pack. For the SM-BUS communication, the terminal S provides a safety signal based on an SM-BUS communication protocol. Alternatively, the terminal S may be used as a battery pack recognition terminal or thermistor terminal.

The electronic circuitry 200 is adapted to control the charging and discharging operations of the battery pack which supplies power to the host via the host interface 300, and perform the SMART communication of the battery pack with the host via the host interface 300. To this end, the electronic circuitry 200 includes the protection circuit 220, microprocessor 210, nonvolatile memory 230 and signal processor 240, as described above. Among these constituent elements, the protection circuit 220, nonvolatile memory 230 and signal processor 240 are well known to those skilled in the art, and a detailed description of the circuit constructions and operations thereof will thus be omitted.

The microprocessor 210 is adapted to monitor the current state of the battery array 100, calculate a battery capacity thereof and control the SMART communication with the host via the host interface 300. In the present embodiment, the microprocessor 210 may be an Atmel 163L product commercially available from ATMEL Corporation, which can upload a program via an SPI serial interface.

In response to an information upgrade request, the Atmel 163L chip synchronizes clocks of the battery pack and host with each other through an SCK terminal of an SPI port and then uploads information stored in an Atmega 163 nonvolatile memory to the master, or host, through a master input/slave output (MISO) terminal. The host analyzes the uploaded information and recognizes the information upgrade request as a result of the analysis. Upon recognizing the information upgrade request, the host applies a "LOW" signal to a /RESET terminal to erase the information currently stored in the Atmega 163 nonvolatile memory. The host then stores upgraded information (data or program) therein into the memory through a master output/slave input (MOSI) terminal.

The microprocessor 210 uploads data to the host by performing the SMART communication with the host in the SM-BUS communication manner stated above in connection with the host interface 300. Subsequently, the microprocessor 210 downloads upgraded information from the host in response to a command therefrom and stores the downloaded information in the nonvolatile memory 230. In the present embodiment, the microprocessor 210 may be a one-chip microprocessor containing the nonvolatile memory 230.

An input/output port 500 is provided as means for inputting a program in the above manner. The input/output port 500 performs an interfacing operation between the host and the microprocessor 210 to download a control program and data to be stored in the nonvolatile memory 230 from the host.

The input/output port 500 includes a reset terminal for erasing various data stored in the battery pack in response to a control signal from the host, a first serial output terminal for outputting a control program and data inputted from the host to the battery pack, and an SCK terminal for establishing a clock synchronization for communication between the host and the battery pack. The first serial output terminal is preferably an MOSI terminal. The input/output port 500 further includes a second serial output terminal for uploading a control program and data stored in the nonvolatile memory 230 to the host. The second serial output terminal is preferably an MISO terminal.

The above-described construction enables the SMART battery pack according to the present invention to upgrade battery associated information and software stored therein through communication with the host without its disassembly.

The input/output port 500 has six head pins mounted on an electronic circuit board, which are connected with the host via corresponding holes of a case 400. Alternatively, the input/output port 500 may be a wired communication interface such as a USB, RS-232, etc., or a wireless communication interface such as a wireless LAN, etc. for the convenience of use. Preferably, the input/output port 500 may be physically implemented in a single connector along with the host interface 300.

A description will hereinafter be given of the operation of the upgradable SMART battery pack with the above-described construction in accordance with the preferred embodiment of the present invention. Under the condition that the battery pack is connected to a notebook (host) through the input/output port, it uploads a control program and data stored in the nonvolatile memory 230 to the host through the MISO terminal of the microprocessor 210. At this time, the battery pack communicates with the host in the SM-BUS communication manner using a clock which is synchronized with that of the host through the SCK terminal. The host analyzes the uploaded data. Upon recognizing a data upgrade request as a result of the analysis, the host applies a low signal to the /RESET terminal of the microprocessor 210 through the input/output port 500. The microprocessor 210 erases the control program and data stored in the nonvolatile memory 230 in response to the low signal applied thereto. Thereafter, the microprocessor 210 receives upgraded data supported from the host through the MOSI terminal and stores the received data in the nonvolatile memory 230. As a result, the battery pack can perform the SMART function according to the upgraded control program.

As apparent from the above description, the present invention provides an upgradable SMART battery pack which is capable of upgrading battery associated information and software stored therein without its disassembly in response to a software-based upgrade request, thereby preventing an economic loss resulting from the pack disassembly and performing the upgrading operation more rapidly and effectively.

Furthermore, the upgrading of the battery pack under the condition of no disassembly enables high-quality upgrade products to come into the market within a shorter period of time, resulting in an increase in the competitiveness thereof in the market place.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An upgradable Self-Monitoring Analysis and Reporting Technology (SMART) battery pack, comprising:
   a battery array;
   a host interface for supplying power to a host and performing a SMART communication with said host;
   a protection circuit for protecting a battery cell in said battery array from overcurrent or overvoltage;
   a microprocessor for monitoring a current state of said battery array, calculating a battery capacity of said battery array and controlling said SMART communication between said host and said host interface;
   a memory for storing an operational program of said microprocessor and battery information;
   a signal processor for converting a level of a signal to be sent to said host via said host interface into a predetermined level that is desired by said host and processing the level-converted signal; and
   an input/output port for performing an interfacing operation between said host and said microprocessor to download a control program and data from said host;
   wherein said input/output port includes:
   a reset terminal for erasing data stored in said battery pack in response to a control signal of said host; and
   a first serial output terminal for downloading said control program and data from said host to said battery pack.

2. The upgradable SMART battery pack as set forth in claim 1, wherein said input/output port further includes a second serial output terminal for uploading said control program and data from said battery pack to said host.

3. The upgradable SMART battery pack as set forth in claim 1, wherein said host interface and said input/output port are connected in a single connector.

4. The upgradable SMART battery pack as set forth in claim 1, wherein the memory is a nonvolatile memory.

5. The upgradable SMART battery pack as set forth in claim 1, wherein said downloaded control program and data are stored in said memory.

6. The upgradable SMART battery pack as set forth in claim 1, wherein said host interface communicates with said host in one-wire synchronous communication manner, one-wire asynchronous communication manner, two-wire synchronous communication manner, or two-wire asynchronous communication manner.

7. The upgradable SMART battery pack as set forth in claim 1, wherein said input/output pan includes a wired communication interface or a wireless communication interface.

* * * * *